(12) United States Patent
Chumbley (10) Patent No.: US 10,924,289 B2
(45) Date of Patent: Feb. 16, 2021

(54) PUBLIC-PRIVATE KEY PAIR ACCOUNT LOGIN AND KEY MANAGER

(71) Applicant: Visa International Service Association, San Francisco, CA (US)

(72) Inventor: Robert Chumbley, Round Rock, TX (US)

(73) Assignee: Visa International Service Association, San Francisco, CA (US)

(*) Notice: Subject to any disclaimer, the term of this patent is extended or adjusted under 35 U.S.C. 154(b) by 262 days.

(21) Appl. No.: 16/035,480

(22) Filed: Jul. 13, 2018

(65) Prior Publication Data

US 2020/0021448 A1 Jan. 16, 2020

(51) Int. Cl.
*H04L 29/06* (2006.01)
*H04L 9/32* (2006.01)
*H04L 9/08* (2006.01)

(52) U.S. Cl.
CPC .......... *H04L 9/3271* (2013.01); *H04L 9/0825* (2013.01); *H04L 9/0894* (2013.01); *H04L 63/0442* (2013.01); *H04L 63/0884* (2013.01); *H04L 63/123* (2013.01)

(58) Field of Classification Search
CPC ... H04L 9/3271; H04L 9/0825; H04L 9/0894; H04L 63/0442; H04L 63/0884; H04L 63/123; H04L 2463/062; H04L 63/0823
See application file for complete search history.

(56) References Cited

U.S. PATENT DOCUMENTS 8,332,650 B2 12/2012 Banes et al.
8,447,990 B2 5/2013 Utin
9,055,055 B1 * 6/2015 Strand ................. H04L 63/0815
9,489,510 B1 11/2016 Scott et al.
9,727,715 B2 8/2017 Boodaei
10,136,315 B2 * 11/2018 Gong ....................... H04B 7/14
10,231,128 B1 3/2019 Ziraknejad et al.
10,666,642 B2 5/2020 Antonyraj et al.
(Continued)

FOREIGN PATENT DOCUMENTS

WO WO-2017004466 A1 * 1/2017 ......... H04L 63/0428

OTHER PUBLICATIONS

PCT/US2019/035420, "International Search Report and Written Opinion", dated Oct. 1, 2019, 11 pages.
(Continued)

*Primary Examiner* — Mahfuzur Rahman
(74) *Attorney, Agent, or Firm* — Kilpatrick Townsend & Stockton LLP (57) ABSTRACT

Embodiments of the invention provide improved account authentication using public-private key cryptography instead of passwords. Instead of registering a password and using that password to login to an account, an authentication server of an account provider registers a public key received from a user device. To authenticate the user device for logging into an account, the authentication server generates a challenge and encrypts using the registered public key. The encrypted challenge is sent to the user device, which can decrypt the challenge using the private key corresponding to the registered public key. The decrypted challenge is used for authentication instead of using a password. The private key corresponding to the public key is securely stored and not revealed to the authentication server.

20 Claims, 5 Drawing Sheets

(56) References Cited

U.S. PATENT DOCUMENTS

| | | | |
|---|---|---|---|
| 2007/0081667 A1* | 4/2007 | Hwang | H04L 9/3271 380/30 |
| 2008/0189551 A1 | 8/2008 | Chang | |
| 2009/0177889 A1 | 7/2009 | Sung et al. | |
| 2009/0198997 A1* | 8/2009 | Yeap | H04L 51/28 713/155 |
| 2010/0017596 A1 | 1/2010 | Schertzinger | |
| 2011/0072274 A1* | 3/2011 | Leoutsarakos | H04L 9/3255 713/182 |
| 2011/0078080 A1* | 3/2011 | Grube | G06F 21/6218 705/44 |
| 2013/0205370 A1 | 8/2013 | Kalgi et al. | |
| 2014/0047522 A1 | 2/2014 | Chin et al. | |
| 2015/0372811 A1* | 12/2015 | Le Saint | H04L 63/068 705/76 |
| 2016/0070894 A1* | 3/2016 | Boodaei | H04L 63/083 713/155 |
| 2016/0173277 A1* | 6/2016 | Sakumoto | G06F 21/33 380/277 |
| 2016/0218875 A1* | 7/2016 | Le Saint | H04L 63/045 |
| 2018/0183777 A1* | 6/2018 | Guillory | H04L 9/3271 |
| 2019/0347435 A1 | 11/2019 | Zheng et al. | |
| 2019/0372786 A1* | 12/2019 | Ra | G06F 21/30 |

OTHER PUBLICATIONS

U.S. Appl. No. 16/038,011; Notice of Allowance dated Jul. 20, 2020; 14 pages.

\* cited by examiner

PUBLIC-PRIVATE KEY PAIR ACCOUNT LOGIN AND KEY MANAGER

BACKGROUND

Many computer and web-based account providers use passwords to secure account logins. For example, passwords can be used to authenticate a person accessing an operating system login account, a website account, a software application, or a database. An account password, which is typically an alphanumeric string of characters, a gesture, an image, or a drawing, is often set by the user of the account when registering with an account provider. The account provider stores the user's password and associates it with an account name so that the user can authenticate with the password to login to their account.

While password-based authentication is commonplace, it suffers from many security concerns. Depending on the level of password complexity, a user's password may be determined or guessed using a dictionary or brute force attack. Passwords can also be determined by key-logging software or malware running on the user's device. In addition, a user may be deceived through phishing or social engineering to reveal their password. Also, the user's password may be obtained if an account provider's server storing that password is compromised. Accordingly, there is a need for improved systems and methods for account login authentication.

Embodiments of the invention address these and other problems individually and collectively.

SUMMARY

Embodiments of the invention provide improved systems and methods for account login authentication.

One embodiment is directed to a method for account login authentication that can be performed by a user device. The method includes sending, by the user device, a login request message to an authentication server. The login request message includes a public key. The public key, along with a corresponding private key, forms a first public-private key pair. The method further includes receiving, by the user device, an encrypted challenge from the authentication server. The method further includes decrypting, by the user device, the encrypted challenge using the private key to obtain a decrypted challenge. The method further includes sending, by the user device, the decrypted challenge to the authentication server. The method further includes receiving, by the user device, account information from the authentication server.

Another embodiment is directed to a method for account login authentication performed by an authentication server. The method includes receiving, by the authentication server, a login request message from a user device. The login request includes a public key. The method further includes verifying, by the authentication server, that the public key matches a registered public key associated with an account. The method further includes generating, by the authentication server, a first challenge. The method further includes encrypting, by the authentication server, the first challenge using the public key to obtain an encrypted challenge. The method further includes sending, by the authentication server, the encrypted challenge to the user device. The method further includes receiving, by the authentication server, a second challenge from the user device. The method further includes determining, by the authentication server, that the second challenge matches the first challenge. The method further includes sending, by the authentication server in response to the determining that the second challenge matches the first challenge, account information to the user device.

Another embodiments is directed a user device. The user device comprises one or more processor circuits. The user device further comprises a communication interface. The user device further comprises a computer readable storage medium storing a plurality of instructions. The plurality of instructions, when executed by the one or more processor circuits, cause the one or more processor circuits to send, using the communication interface, a login request message to an authentication server. The login request includes a public key. The public key and a private key form a first public-private key pair. The plurality of instructions further cause the one or more processors to receive, using the communication interface, an encrypted challenge from the authentication server. The plurality of instructions further cause the one or more processors to decrypt the encrypted challenge using the private key to obtain a decrypted challenge. The plurality of instructions further cause the one or more processors to send, using the communication interface, the decrypted challenge to the authentication server. The plurality of instructions further cause the one or more processors to receive, using the communication interface, account information from the authentication server.

Further details can be found in the detailed description and the figures.

DETAILED DESCRIPTION

Figure 1:
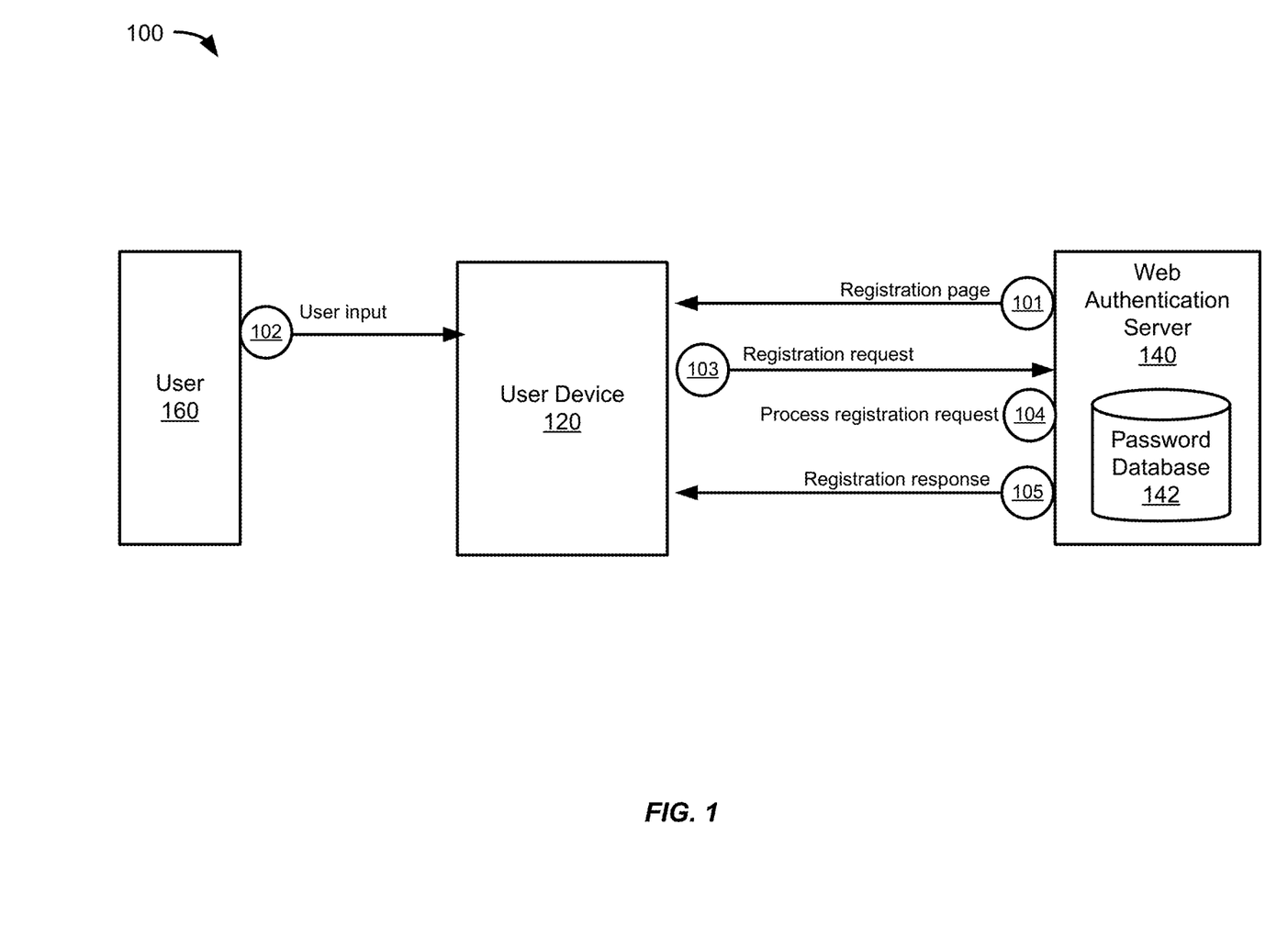
FIG. 1 shows an information flow diagram of an exemplary account registration process establishing a password for account authentication.

Passwords are often used to login to accounts maintained by websites and software applications. Account users may be able to set a password and an account name (e.g., user name) during a registration process with the account provider. FIG. 1 shows an information flow diagram 100 of an exemplary account registration process establishing a password for account authentication. A user 160 can use a user device 120 (e.g., personal computer or mobile device) to access a website hosted by a web authentication server 140 or a software application on the user device 120 having data retrieved from the web authentication server 140. In some cases the web authentication server 140 may perform authentication but a different server may provide account data or information.

The user 160 can register an account and password with the web authentication server 140. The password may be used to authenticate with the web authentication server 140 in order to login or access the user's account. At step 101 of the registration process, the web authentication server 140 can provide a registration page to the user device 120. The registration page can be a webpage for a web browser or it can be a page or screen (e.g., graphical user interface) of a software application. The registration page can be displayed as a graphical user interface on a display screen of the user device 120. In some embodiments, the user device 120 may store data for creating the registration page in a system memory (e.g., as part of an application) and step 101 may not be performed. The registration page may include text-entry fields for entering an account name (e.g., a user name) and a password. In some embodiments, the registration page can include other fields for inputting different types of passwords or authentication information. In some embodiments, the account name may be pre-selected by the web authentication server 140 instead of being entered by the user. In other embodiments, the user 160 may provide input to a user interface of the user device 120 to enter the account name.

At step 102, the user 160 provides input to a text-entry user interface of the user device 120 (e.g., a touch screen software keyboard, a physical keyboard, a pointer device, or voice activated text-entry). The input by the user 160 includes the password selected by the user 160. In some embodiments, the user input at step 102 can also include an account name. In registering a new account, users typically select memorable passwords so that they do not forget them. However, such passwords are often more susceptible to being discovered using password security attacks (e.g., dictionary attacks or brute force attacks). Password complexity can be increased by increasing the length of the password or by mixing upper-case letters, lower-case letters, numbers, and special characters, as compared to less complex passwords using only alphanumeric characters, or less complex than that, only lower-case letters). More complex passwords have less risk of being discovered through such attacks. However, more complex passwords may be difficult for users to remember.

The user device 120 creates a registration request message to send to the web authentication server 140. The registration request message includes the password input by the user 160. In some embodiments, where the user 160 inputs the account name, the registration request message also includes the account name. At step 103, the user device 120 sends the registration request message to the web authentication server 140. The registrations request message can be sent to the web authentication server 140 over a communication network (e.g., the Internet). The user device 120 may include a network communication interface (e.g., an Ethernet network interface controller, a Wi-Fi network interface controller, or a cellular network interface controller). The communication interface may be part of an integrated system on chip (SOC) of the user device 120.

The web authentication server 140 receives the registration request message from the user device 120 over the communication network. The web authentication server 140 may also include a communication interface (e.g., an Ethernet network interface controller, a Wi-Fi network interface controller, or a cellular network interface controller) that is used to receive network communications, such as the registration request message.

At step 104, the web authentication server 140 processes the registration request message. The processing of the registration request message includes retrieving the password from the message and storing it in a password database 142. The stored password is associated with the account name for the user's account. As discussed above, the account name may be pre-determined by the web authentication server 140 or it may be entered by the user 160 and included in the registration request message. The stored password can be used later during an account login process. A password received during the account login process can be checked against the stored password to determine whether the user is authenticated to access the account.

At step 104, if the user has selected an account name, the web authentication server 140 can check whether or not that particular account name is already in use. The web authentication server 140 may perform this step if account names are used as identifiers of the accounts. The web authentication server 140 may store an account database including account information for the accounts maintained by the web authentication server 140. The account database can include the corresponding account names for each of the accounts. Accordingly, the web authentication server 140 can compare the account name included in the registration request message (e.g., the account name input by the user 160) to the account names stored in the account database to determine whether any match.

If the account name included in the registration request matches an account name in the account database, then the web authentication server 140 may not register the account name to the user 160. In this case, the web authentication server 140 sends a registration response message to the user device 120, at step 105, including an indication that the account name has not been registered. The web authentication server 140 can send the registration response message to the user device 120 over the communication network.

If the account name included in the registration request does not match any of the account names in the account database, then the web authentication server 140 may register the account name to the user 160. In this case, the web authentication server 140 sends a registration response message to the user device 120 over the communication network, at step 105, including an indication that the account name is registered.

Figure 2:
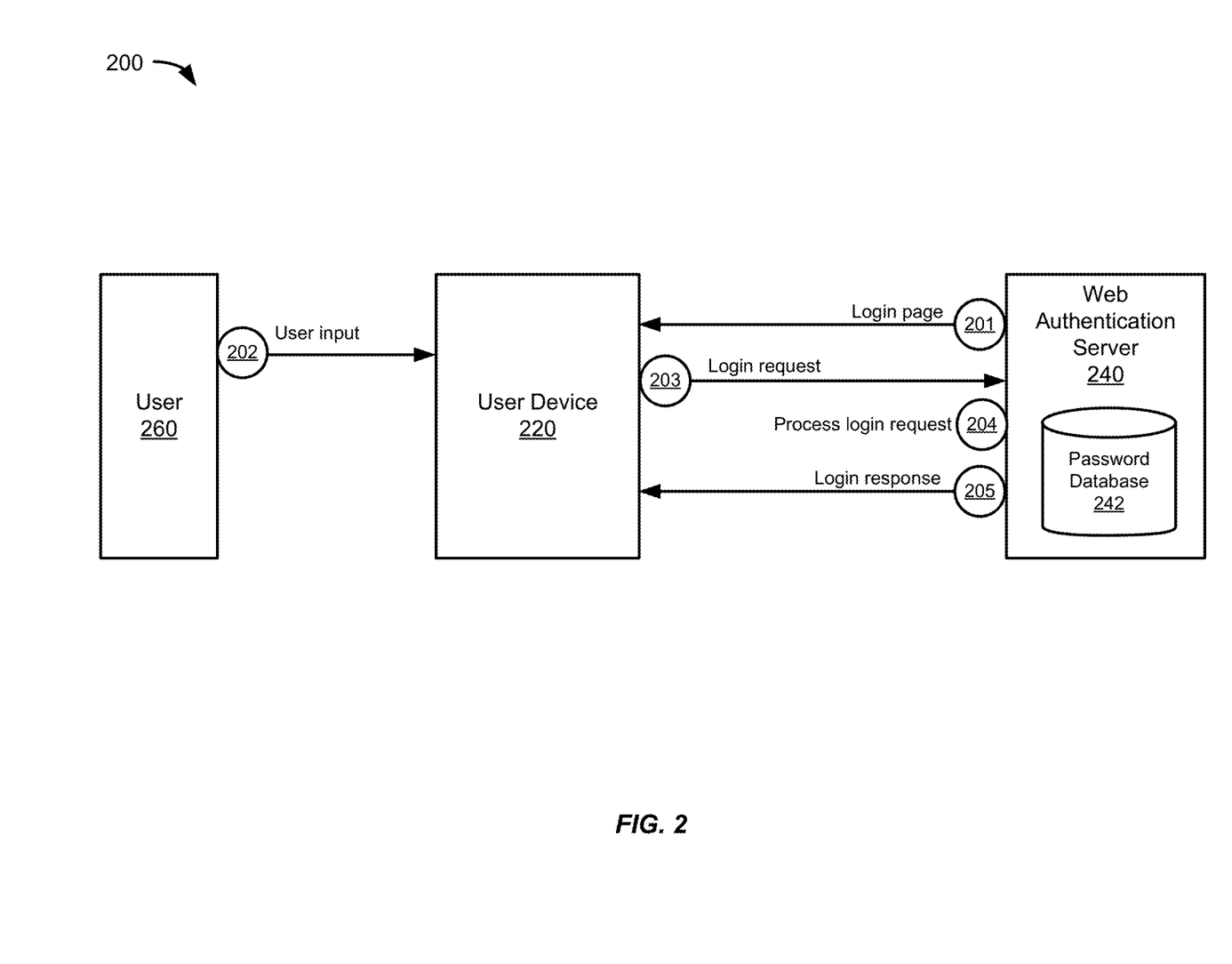
FIG. 2 shows an information flow diagram of an exemplary account login process using a password for account authentication.

FIG. 2 shows an information flow diagram 200 of an exemplary account login process using a password for account authentication. The account login information flow of FIG. 2 may occur after the account registration information flow of FIG. 1. The user 260, the user device 220, the web authentication server 240, and the password database 242 of FIG. 2 may be similar to the user 160, the user device 120, the web authentication server 140, and the password database 142 of FIG. 1, respectively.

At step 201 of the login process, the web authentication server 240 provides a login page to the user device 220. The login page can be a webpage for a web browser or it can be a page or screen of a software application. The login page can be displayed as a graphical user interface on a display screen of the user device 220. In some embodiments, the user device 220 may store the login page in a system memory (e.g., as part of an application) and step 101 may not be performed. The login page may include text-entry fields for entering an account name (e.g., a user name) and a password. Thus, the user 260 can enter their registered account name and password to access their account and/or account information.

At step 202, the user 260 provides input to a text-entry user interface of the user device 220 (e.g., a touch screen software keyboard, a physical keyboard, a pointer device, or voice activated text-entry). The input by the user 260 includes the password selected by the user 260 and previously registered at with the web authentication server 240. In some embodiments, the user input at step 202 also includes the corresponding registered account name.

After obtaining input from the user, the user device 220 creates a login request message to send to the web authentication server 240. The login request message includes the password input by the user 260. In some embodiments, where the user 260 inputs the account name, the login request message also includes the account name. At step 203, the user device 220 sends the login request message to the web authentication server 240. The login request message can be sent to the web authentication server 240 over a communication network (e.g., the Internet). The user device 220 may include a network communication interface (e.g., an Ethernet network interface controller, a Wi-Fi network interface controller, or a cellular network interface controller) for sending communications over the communication network.

The web authentication server 240 can receive the login request message from the user device 220 over the communication network. At step 204, the web authentication server 240 processes the login request message. The processing of the login request message can include checking whether the account name is registered. The web authentication server 240 can check whether the account name included in the login request message matches any of the account names stored in the password database 242 to determine whether the account name is registered. In some embodiments, the web authentication server 240 could compare the account name included in the login request message to account names stored in the account database that also stores users account information.

The processing of the login request message can include verifying the password received in the login request message against the stored password associated with the account name. The web authentication server 240 can use the account name included in the login request message to retrieve a password associated with the account name from the password database 242. If the password from the login request message matches the stored password associated with the account name, then the user 260 has been authenticated to access the corresponding account information. If the password from the login request message does not match the stored password associated with the account name, then the user 260 is not authenticated to access the corresponding account information.

At step 205, the web authentication server 240 sends a login response message to the user device 220 over the communication network. The login response message can includes an indication of whether the password received in the login request message matched the stored password associated with the account name (e.g., whether the login was authenticated or not).

As described above with respect to FIGS. 1 and 2, passwords established during account registration can be used to login to that account. Password security can be improved in numerous ways. For example, the password database 242 may be encrypted to improve the security of the passwords against being compromised. However, the encrypted passwords may be decrypted if the encryption key or password is compromised. In some embodiments, the password database 242 may store hashes of the passwords instead of storing the passwords themselves. Thus, password security is improved because the passwords themselves are not stored at the web authentication server 240, only the hashes of the passwords. In such embodiments, the passwords received during the registration process are hashed and only the hashes of the passwords are stored in the password database 242. These password hashes are associated with the corresponding account name. When a password is received during the account login process, the received password is hashed and compared against the stored password hash that is associated with the account name.

To further increase password security, the web authentication server 240 can randomize the password hashes by appending or prepending a "salt" value (e.g., a random string) to the password before hashing it. As such, passwords that are the same will have different hashes as a result of using the randomized salt value. The salt value may be stored in the account information for the account or it may be added to the password hash. Use of a salt value in hashing the password may prevent the password from being discovered from the hash value using lookup tables (e.g., a table with precomputed password hashes of passwords from a password dictionary), reverse lookup tables (e.g., a table that matches stored hashes at a server to user's accounts), rainbow lookup tables, or other similar techniques.

However, even if the user's password is secured at the web authentication server using encryption or hashing, such techniques do not make password usage entirely secure. For example, some users may use the same account name (e.g., email address) and the same password for various accounts provided by different account providers. Thus, if one server (e.g., a less secure server) is compromised, then the user's password is compromised regardless of how secure the other servers are. In addition, the user's password may be compromised at the user or user device side. For example, a password can be determined by key-logging software or malware running on the user device. In addition, the user may be deceived to reveal their password through phishing (e.g., fraudulent communications that appear to be legitimate) or social engineering techniques (e.g., communications that manipulate people into revealing confidential information). Computer implemented security may not be able to protect a password if the user is tricked into revealing it. Thus, the use of passwords for account authentication suffers from many security vulnerabilities, many of which cannot be solved through improved computer-based security. There is a need for improved authentication techniques that are resistant or immune to such security compromises.

Embodiments of the invention described below provide improved account authentication process using public-private key cryptography instead of passwords. During an account registration process, the user device can generate a public-private key pair including a public key and a private key. Instead of establishing a password for authentication, the user device can send the public key to the web authentication server to use for authentication instead. To authenticate the user device during an account login process, the web authentication server can generate a challenge and encrypt the challenge using the registered public key. The user device can decrypt the challenge using the private key corresponding to the public key (e.g., the private key of the key pair including the public key). The user device can send the decrypted challenge to the web authentication server as proof of authentication.

The web authentication server can compare the challenge that it previously generated to the decrypted challenge received from the user device. If the decrypted challenge from the user device matches the generated challenge, then the user device is authenticated and the web authentication server may grant the user device access to the corresponding account. If the decrypted challenge from the user device does not match the generated challenge, then the user device is not authenticated and the user device is denied access to the corresponding account.

Authentication using public-private key cryptography does not suffer from many of the security flaws described above with respect to password-based authentication. For instance, a security compromise of the user device's registered public key at the web authentication server, or any other server, does not compromise the user's authentication information (e.g., the private key used to decrypt the challenge) because the public key alone cannot be used to decrypt a challenge encrypted by the public key. That is, the public key and encrypted challenge cannot be used to obtain the challenge generated by the web authentication server. With public-private key cryptography, the private key is required to decrypt a challenge encrypted by the public key. However, the private key may be securely stored at the user device, may not be sent over a communication network, and may not be accessible by any other device. Thus, a compromise at the server side does not compromise the user's authentication information.

Another advantage of public-private key cryptography-based authentication is that the authentication information (e.g., the private key) can be securely stored in a secure hardware or software environment implemented on the user device. When passwords are used as authentication information, they may be available as clear text (e.g., unencrypted), outside of any secure environment, at some point during the registration and/or login process. For example, the password may be accessible by key-logging software as the user is inputting it. By contrast, with public-private key cryptography-based authentication, the private key (e.g., the authentication information) of the public-private key pair may be generated and stored within the secure environment while the public key and the encrypted/decrypted challenge may be accessible outside of the secure environment. As such, the authentication information for authenticating with the web authentication server (e.g., the private key) is secured even if the non-secure environment of the user device is comprised.

In addition, private keys cannot be determined from the user through phishing or social engineering techniques. For example, a phishing website would at best receive a decrypted challenge as proof of authentication from the user device. The phishing website would not receive the private key. Furthermore, social engineering techniques would be ineffective because the user may not know, or be able to view, the private key if it is stored within the secure environment. Even if the private key were available to the user, they are unlikely to be able to recall its value since the user does may not directly interact with the private key value and the value may be so long as to be impractical to recall.

Thus, public-private key cryptography-based authentication provides numerous security improvements over password-based authentication processes. Prior to discussing specific embodiments of the invention, some terms may be described in detail.

I. Terms

A "user" can be a person or thing that employs some other thing for some purpose. A user may include an individual that may be associated with one or more personal accounts and/or mobile devices. The user may also be referred to as an account holder in some embodiments.

A "user device" may comprise any suitable computing device that can be used for communication. A user device may also be referred to as a "communication device" or a "computing device." A user device may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of user devices include desktop computers, videogame consoles, mobile phones (e.g., cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote or direct communication capabilities. A user device may comprise any suitable hardware and software for performing such functions, and may also include multiple devices or components (e.g., when a device has remote access to a network by tethering to another device—i.e., using the other device as a modem—both devices taken together may be considered a single communication device).

The term "server computer" may include any suitable computing device that can provide communications to other computing devices and receive communications from other computing devices. For instance, a server computer can be a mainframe, a minicomputer cluster, or a group of servers functioning as a unit. In one example, a server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers. Data transfer and other communications between components such as computers may occur via any suitable wired or wireless network, such as the Internet or private networks. The "web authentication server" described herein may be implemented by a server computer.

An "account provider" refers to an entity that provide accounts for use by users and/or user devices. Examples of the types of accounts that can be provided by account providers include e-mail accounts, digital storage accounts, social media accounts, merchant or e-commerce website accounts, etc. An account provider may provide a "web authentication server" to maintain and store account information and authentication information (e.g., public keys, passwords, or password hashes) for each user account. In some embodiments, the web authentication server may store the authentication information used during registration and login processes while a separate server stores the account information to be provided after a user device is authenticated.

The term "public/private key pair" may include a pair of linked cryptographic keys generated by an entity (e.g., a computer or an electronic device). The public key may be used for public functions such as encrypting a message to send to the entity or for verifying a digital signature which was supposedly made by the entity. The private key, on the other hand, may be used for private functions such as decrypting a received message or applying a digital signature. The private key will typically be kept in a secure storage medium and will usually not be known to other entities. However, the cryptographic systems described herein may feature key recovery mechanisms for recovering lost keys and avoiding data loss. Public and private keys may be in any suitable format, including those based on RSA Rivest-Shamir-Adleman (RSA) cryptography or elliptic curve cryptography (ECC).

An "encryption key" may include any data value or other information suitable to cryptographically encrypt data. A "decryption key" may include any data value or other information suitable to decrypt encrypted data. In some cases, the same key used to encrypt data may be operable to decrypt the data. Such a key may be known as a symmetric encryption key.

The term "authentication" generally refers to a process of establishing confidence in the identity of a user or a computer. Authentication may be performed using passwords, pass codes, images, or gestures. Authentication may also be performed by confirming the identity of a device using public key cryptography (e.g., encrypted data or digital signatures) for authentication information. Authentication may also be performed using biometric data. The term "authentication data" or "authentication information" may include any data or information suitable to authenticate a user or device. In addition, authentication data may refer to data that can be used during an authentication process along with other information (e.g., an encryption key used to encrypt/decrypt data for authentication). Examples of authentication data may include a password or passphrase, decrypted challenge, a public key corresponding to a registered public key, a secret key (e.g., a private key), a digital signature, an indication that the device is storing certain information, etc. An "authentication server" that receives authentication information (e.g., a password, a public key, a decrypted challenge) and conduct an authentication process using that information. The authentication server may be a "web authentication server" that performs authentication for accessing online accounts via a website. A "web authentication server" may also perform authentication for accounts accessed using a mobile application instead of a web browser. That is, the term "web authentication server" is not intended to be limited to use with websites only, but is intended to cover authentication across networks without necessarily using a web browser.

A "challenge" or "challenge phrase" refers to a data value used during an authentication process. The challenge may be an alphanumeric word, phrase, or string of characters. The challenge may also be a bit string or bit array. The challenge may be randomly generated or may be pre-determined. In some embodiments, a new challenge may be used for each different login request.

An "Application Programming Interface" (API) is a set of procedures, protocols, or tools for building software applications. An API may be used to build applications which allow communication between one or more entities. Examples of APIs include POSIX, and the C++ Standard Template Library. An "API call" is a communication between two software applications or computers made possible by an API. An API call could include a standardized method of requesting or delivering information between software applications, such as a client-side application and a server-side application according to the server-side API. An API call could take the form of an HTTP method, such as GET, POST, PUT, or DE. Account registration and account login messages described here can be formatted and transmitted according to one or more APIs.

As used herein, the term "providing" may include sending, transmitting, making available on a web page, for downloading, through an application, displaying or rendering, or any other suitable method. In various embodiments of the invention, rule profiles, rule outcome frequencies, and rule outcome disposition frequencies may be provided in any suitable manner.

A "processor" or "processor circuit" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron, etc.; IBM and/or Motorola's PowerPC; IBM's and Sony's Cell processor; Intel's Celeron, Itanium, Pentium, Xeon, and/or Xscale, etc.; and/or the like processor(s).

A "memory" or "system memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Messages communicated between any of the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

II. Authentication Using Public-Private Key Cryptography

Embodiments of the invention provide improved account authentication process using public-private key cryptography instead of passwords. Instead of registering a password and using that password to login, a public key is registered and the private key is used to decrypt a challenge that has been encrypted using the public key. The decrypted challenge is used to authenticate with the web server as proof that the user device has access to the private key corresponding to the registered public key. In the embodiments described below, the public key of the public-private key pair is provided to the web authentication server of the account provider. Thus, the private key of the public-private key pair is resistant to being compromised because it is securely stored and is not provided to any other computing device. Account registration and login processes using public-private key cryptography are described below with respect to FIGS. 3 and 4.

Figure 3:
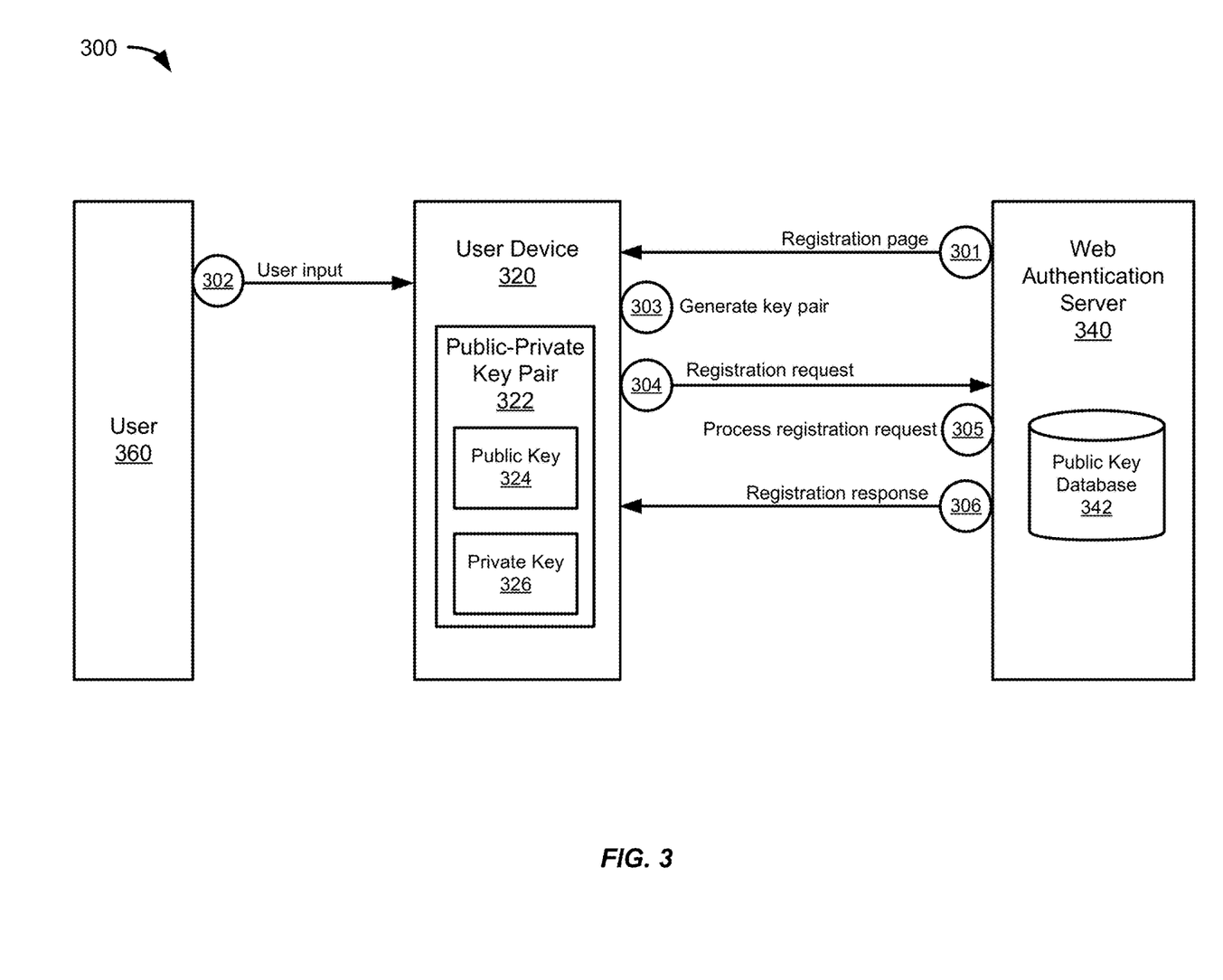
FIG. 3 shows an information flow diagram of an account registration process using public-private key cryptography for account authentication, in accordance with some embodiments.

FIG. 3 shows an information flow diagram 300 of an account registration process using public-private key cryptography for account authentication, according to an embodiment of the invention. A user 360 can use a user device 320 (e.g., personal computer or mobile device) to access a website or software application hosted by a web authentication server 340. The user 360 can register a public key with the web authentication server 340. The public key and a corresponding private key, forming a public-private key pair, may be used to authenticate with the web authentication server 340 in order to login or access the user's account.

At step 301 of the registration process, the web authentication server 340 can provide a registration page to the user device 320. The registration page can be a webpage for a web browser or it can be a page or screen of a software application. The registration page can be displayed as a graphical user interface on a display screen of the user device 320. In some embodiments, the user device 320 may store the registration page in a system memory (e.g., as part of an application) and step 301 may not be performed.

The registration page may include an indication of the account provider. The registration page may include a button to initiate the account registration process. In some embodiments, the registration page may include a text-entry field for entering an account name (e.g., a user name). In other embodiments, the user 360 may provide input to a user interface of the user device 320 to enter the account name. In other embodiments, the account name may be pre-selected by the web authentication server 340 and the registration page may indicate the pre-selected account name. In some embodiments, the registration page may include a text-entry field for entering a public key to be registered. In other embodiments, the public key may be provided to the web authentication server automatically without requiring text-entry input by the user 360.

At step 302, if the registration page includes the text-entry field for entering the account name, then the user 360 can provide input to the text-entry field using a text-entry user interface of the user device 320 (e.g., a touch screen software keyboard, a physical keyboard, a pointer device, or voice activated text-entry). The input by the user 360 can be set as the account name.

At step 303, the user device 320 generates a public-private key pair 322 including a public key 324 and a private key 326. The user device 320 may generate the public-private key pair 322 in response to input to the user interface. For example, the user device 320 may generate the public-private key pair 322 in response to a button press confirming an account name entered by the user at step 302. In another example, the user device 320 may generate the public-private key pair 322 in response to a button press on the registration page to initiate an account registration process.

In public-private key cryptography, the public key 324 may be used for public functions such as encrypting a message to send to the entity or for verifying a digital signature which was supposedly made by the entity. The private key 326, on the other hand, may be used for private functions such as decrypting a received message or applying a digital signature. The private key 326 may be kept in a secure storage medium, a secure hardware environment, or a secure software environment, and may only be accessible to the user device 320 that generated the public-private key pair 322. The public-private key pair 322 may be generated using RSA cryptography or elliptic curve cryptography, for example.

After generating the public-private key pair 322, the user device 320 creates a registration request message to send to the web authentication server 340. The registration request message includes the public key 324 of the public-private key pair 322 generated by the user device 320. In some embodiments, where the user 360 inputs the account name, the registration request message also includes the account name.

At step 304, the user device 320 sends the registration request message to the web authentication server 340. The registration request message can be sent to the web authentication server 340 over a communication network (e.g., the Internet). The user device 320 may include a network communication interface (e.g., an Ethernet network interface controller, a Wi-Fi network interface controller, or a cellular network interface controller) to send such communications over the communication network. In some embodiments, the communication interface may be part of an integrated system on chip (SOC) of the user device 320.

The web authentication server 340 receives the registration request message from the user device 320 over the communication network. The web authentication server 340 may also include a communication interface (e.g., an Ethernet network interface controller, a Wi-Fi network interface controller, or a cellular network interface controller) that is used to receive network communications, such as the registration request message.

At step 305, the web authentication server 340 processes the registration request message. The processing of the registration request message includes determining the public key 324 from the registration request message and storing the public key 324 in a public key database 342. At part of processing the registration request message, the web authentication server 340 can check whether or not the public key 324 included in the registration request message is already registered and in use. The web authentication server 340 can compare the public key 324 included in the registration request message to the public keys stored in the public key database 342 to determine whether any of the stored public keys match the public key 324 included in the registration request message. If the public key 324 included in the registration request message does not match any of the stored public keys stored in the public key database 342, then the web authentication server 340 can register the public key 324 by storing it in the public key database 342. In this case, the web authentication server 340 can send a registration response message, at 306, indicating that the public key 324 has been registered. If the public key 324 included in the registration request message matches a stored public key in the public key database 342, then the web authentication server 340 may not register the public key 324 and may not store it in the public key database 342. In this case, the web authentication server 340 can send a registration response message, at 306, indicating that the public key 324 has not been registered.

As discussed above, the account name may be pre-determined by the web authentication server 340 or it may be entered by the user 360 and included in the registration request message. Where the account name is entered by the user 360, the web authentication server 340 determines the account name from the registration request message and associates that account name with the public key 324 included in the same registration request message. The public key 324, stored in the public key database 342, may be associated with the account name for the user's account. The stored public key 324 can be used later during an account login process to encrypt a challenge, as described below. That is, the public key may not be re-registered.

At step 305, if the user 360 has selected an account name and it is included in the registration request message, the web authentication server 340 can check whether or not that particular account name is already registered and in use as part of the registration request processing. The web authentication server 340 may store an account database including account information for the accounts maintained by the web authentication server 340. The account database can include the corresponding account names for each of the accounts. Accordingly, the web authentication server 340 can compare the account name included in the registration request message (e.g., the account name input by the user 360) to the account names stored in the account database to determine whether any match. In other embodiments, the public key is used as the account name to identify the user's account instead of using a user-selected or pre-selected account name.

At step 305, if the account name included in the registration request matches an account name in the account database, then the web authentication server 340 may not register the account name to the user 360. In this case, the web authentication server 340 sends a registration response message to the user device 320, at step 305, including an indication that the account name has not been registered. The web authentication server 340 can send the registration response message to the user device 320 over the communication network.

If the account name included in the registration request does not match any of the account names in the account database, then the web authentication server 140 may register the account name to the user 160. In this case, the web authentication server 140 sends a registration response message to the user device 120 over the communication network, at step 105, including an indication that the account name is registered.

In some embodiments, the registration response message can indicate that the public key 324 is registered with the account name included in the registration response message. In some embodiments, the registration response message can indicate that the account name is not available. In some embodiments, the registration response message can indicate that the public key is already registered.

Thus, the user device 320 can generate a public-private key pair 322 and register the public key with the web authentication server 340 of the account provider, enabling the user device 320 to authenticate with the web authentication server 340 using the private key 326 during an account login process. As further discussed below, the web authentication server 340 can encrypt a challenge using the registered public key 324 and can authenticate the user device 320 if the user device can decrypt the challenge using the private key 326 and send the decrypted challenge back to the web authentication server 340.

Figure 4:
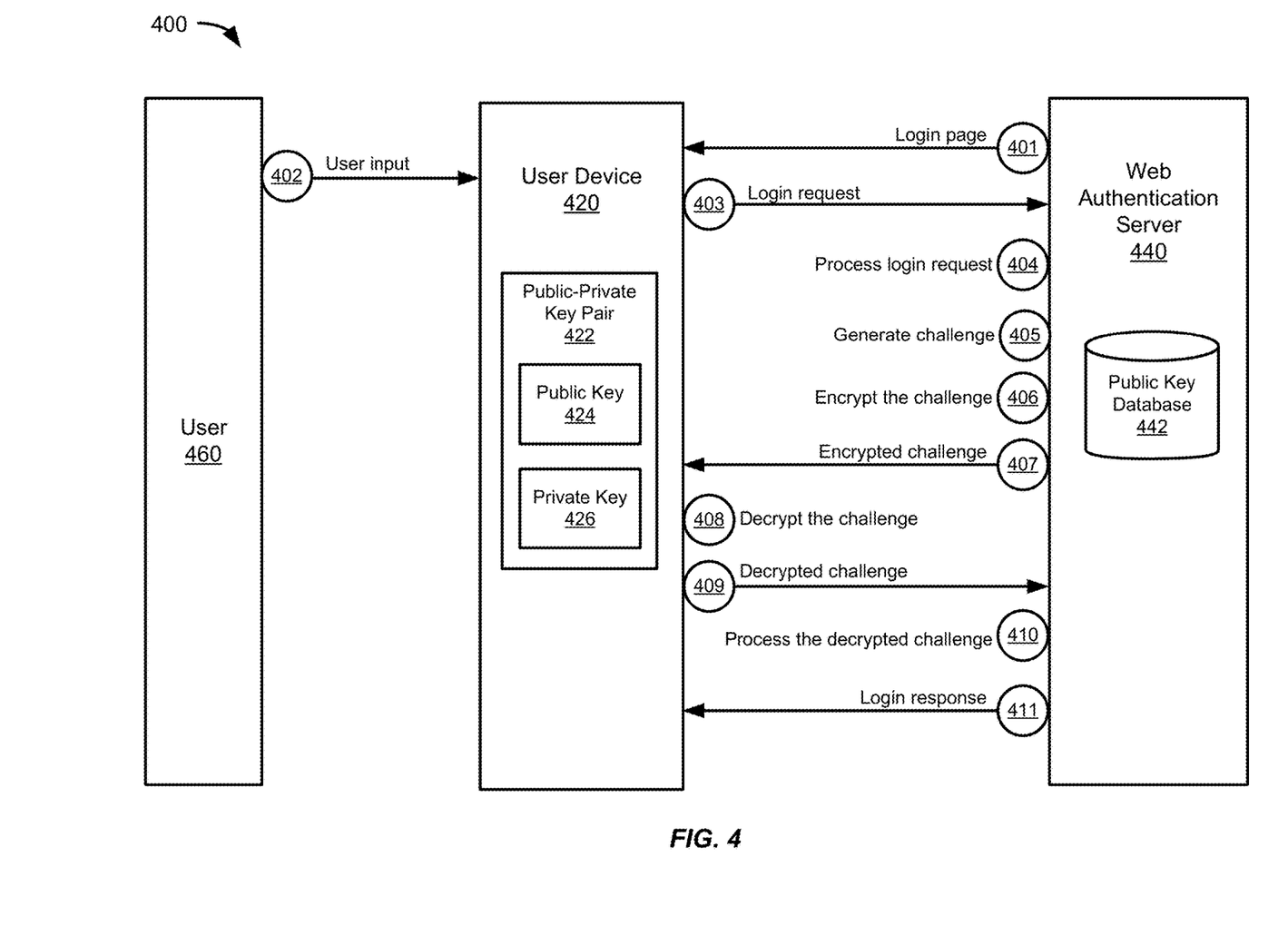
FIG. 4 shows an information flow diagram of an account login process using public-private key cryptography for account authentication, in accordance with some embodiments.

FIG. 4 shows an information flow diagram 400 of an account login process using public-private key cryptography for account authentication, in accordance with some embodiments. The account login information flow of FIG. 4 may occur after the account registration information flow of FIG. 3. The user 460, the user device 420, the web authentication server 440, and the public key database 442 of FIG. 4 may be similar to the user 360, the user device 320, the web authentication server 340, and the public key database 342 of FIG. 3, respectively.

At step 401 of the login process, the web authentication server 440 provides a login page to the user device 420. The login page can be a webpage for a web browser or it can be a page or screen of a software application. The login page can be displayed as a graphical user interface on a display screen of the user device 420. In some embodiments, the user device 420 may store the login page in a system memory (e.g., as part of an application) and step 101 may not be performed.

In some embodiments, the login page can include a button in the user interface to initiate the login process. In some embodiments, the login page can include a text-entry field for entering an account name (e.g., a user name). In some embodiments, the login page can list one or more account names that the user device 420 has previously registered. In some embodiments, the login page can list identifiers of the corresponding account provider along with the one or more account names. In some embodiments, the login page can list one or more public key values that the user device has previously registered in addition to the one or more account names or instead of the one or more account names.

At step 402, if the login page includes a text-entry field for the account name, the user 460 can enter their registered account name. At step 402, if the login page includes a list of one or more account names, or a list of one or more public key values, then the user 460 can provide input to the user interface to select a particular account name or public key. The user 460 can provide input using a user interface of the user device 220 (e.g., a touch screen software keyboard, a physical keyboard, a pointer device, or voice activated text-entry). For example, the user 460 can select a displayed account name associated with the public key 424, or the user 460 can select a displayed public key value for the public key 424, or the user can enter the public key value for the public key 424 into the text-entry field.

After receiving the user input, the user device 420 creates a login request message to send to the web authentication server 440. The login request message includes the public key 424 as selected by the user 460. In some embodiments, where the user 460 inputs the account name, the login request message also includes the account name.

In an alternative embodiment, the user device 420 can create a login request message that include the account name but does not include the public key 424. The login request message may not need to include the public key 424 where the web authentication server 440 has associated the account name with the public key 424 (e.g., during a registration process) and can determine the public key 424 using the associated account name.

At step 403, the user device 420 sends the login request message to the web authentication server 440. The login request message can be sent to the web authentication server 440 over a communication network (e.g., the Internet). The user device 420 may include a network communication interface (e.g., an Ethernet network interface controller, a Wi-Fi network interface controller, or a cellular network interface controller) for sending communications over the communication network. The web authentication server 440 can receive the login request message from the user device 420 over the communication network.

At step 404, the web authentication server 440 processes the login request message. The processing of the login request message can include checking whether the account name is registered. The web authentication server 440 can check whether the account name included in the login request message matches any of the account names stored in the public key database 442 to determine whether the account name is registered. In some embodiments, the web authentication server 440 can compare the account name included in the login request message to account names stored in an account database that also stores users account information. If the account name is not registered, then the web authentication server 240 can decline the login request and the login response message sent at step 411 can include an indication that the account name is not registered. If the account name is registered, the login response message sent at step 411 can include an indication that the account name is registered.

The processing of the login request message can also include verifying that the public key 424 is registered. The web authentication server 440 can check whether the public key 424 included in the login request message matches any of the public keys stored in the public key database 442 to determine whether the public key 424 is registered. If the public key 424 is not registered, then the web authentication server 240 can decline the login request and the login response message sent at step 411 can include an indication that the public key 424 is not registered. If the public key 424 is registered, the login response message sent at step 411 can include an indication that the public key 424 is registered.

At step 405, if the public key is registered, then the web authentication server 440 can generate a challenge to be used in authenticating the user device 420. The challenge may be an alphanumeric word, phrase, or string of characters. The challenge may also be a bit string or bit array. The challenge may be randomly generated by the web authentication server 440 or may be pre-determined. In some embodiments, a new challenge may be used for each different login request.

At step 406, the web authentication server 440 can encrypt the generated challenge using the public key 424 (e.g., the public key 424 received in the login request message and/or the public key 424 stored in the public key database 442, as they are the same) to obtain an encrypted challenge.

At step 407, the web authentication server 440 can send the encrypted challenge to the user device 420. The encrypted challenge can be sent over the communication network using a communication interface of the web authentication server 440. In some embodiments, the public key 424 and/or the corresponding account name may be sent to the user device 420 along with the encrypted challenge.

The user device 420 can receive the encrypted challenge from the web authentication server 440. The encrypted challenge can be received over the communication network using a communication interface of the user device 420. In some embodiments, the public key 424 and/or the account name may be included with the encrypted challenge. The user device can determine the public-private key pair 422 using the account name and/or the public key 424. Then, at step 408, the user device 420 can decrypt the encrypted challenge using the private key 426 of the public-private key pair 422 associated with the account name to obtain a decrypted challenge. Since the private key 426 forms a public-private key pair with the public key 424 used to encrypt the encrypted challenge, the decrypted challenge obtained by the user device 420 will be the same as the challenge generated (and encrypted) by the web authentication server 440. Thus, the user device 420 can prove that it has access to the private key 426 corresponding to the public key 424 that was previously registered with the web authentication server 440.

At 409, the user device 420 can send the decrypted challenge to the web authentication server 440. The decrypted challenge can be sent over the communication network using the communication interface of the user device 420. In some embodiments, the user device 420 can send the public key 424 and/or the account name along with the decrypted challenge. The web authentication server 440 can receive the decrypted challenge from the user device 420. The decrypted challenge can be received over the communication network using the communication interface of the web authentication server 440.

At step 410, the web authentication server 440 can process the decrypted challenge. Processing the decrypted challenge can include determining the corresponding challenge generated by the web authentication server 440 and comparing the generated challenge to the decrypted challenge received from the user device 420 to determine whether the two challenges match. In some embodiments, the web authentication server 440 can associate the generated challenge with the public key or the account name. The web authentication server 440 can determine the challenge that it generated based on a public key or account name received from the user device 420 along with the decrypted challenge. The web authentication server 440 authenticates the user device 420 is the decrypted challenge matches the generate challenge as this proves that the user device 420 has access to the private key 426 that forms the public-private key pair 422 with the public key 424 that was registered with the web authentication server 440. If the decrypted challenge received from the user device 420 does not match the corresponding generated challenge, then the user device is not authenticated. The web authentication server 440 can then generate a login response message including an indication of whether the user device 420 was authenticated or not.

At step 411, the web authentication server 440 can send the login response message to the user device 420. The login response message can be sent over the communication network using the communication interface of the web authentication server 440. The user device 420 can receive the login request message over the communication network using the communication interface of the user device 420.

If the user device 420 is authenticated, then the web authentication server 440 can retrieve account information associated with the public key or account name. The account information can be retrieved from an account database using the public key or account name. The web authentication server 440 can then provide the account information to the user device 420. In some embodiments, the account information is included in the login response message sent at step 411.

Thus, the user device 420 can authenticate with the web authentication server 440 using the private key 426 corresponding to the public key 424 that was registered with the web authentication server 440.

In some embodiments, the account login and authentication processes can be performed automatically by the user device 420 and the web authentication server 440 without requiring input from the user 460. For example, the login page sent by the web authentication server 440 can include an identifier of the web authentication server 440. The identifier of the web authentication server 440 may also be included in the registration page received from the web authentication server at step 301 of FIG. 3. As such, the user device 420 (and similarly, the user device 320 of FIG. 3), can associate the identifier of the web authentication server 440 with the public key 424 registered with that web authentication server 440. Thus, the user 460 may not need to provide input to enter or select an account name.

III. Key Manager

A user device may store and execute a key manager software application that stores public-private key pairs for numerous different accounts. The steps and operations of the user device performed for account registration and account login can be handled by the key manager software application. The key manager software application can also enable the user to select the appropriate public key to use for logging into a particular account at a web authentication server. The key manager software application can also enable the user to view and copy the public key value. The key manager software application can also enable the user to add (e.g., register) new public keys and accounts and to remove existing public keys and accounts. The key manager software application can also provide an interface for viewing the registration pages and login pages described above. The key manager software application can also provide for downloading of a public key or displaying of the public key in text format. The key manager software application can provide a form to paste the encrypted challenge message. The key manager software application can display the decrypted challenge for copying/pasting into a website/application for challenge response.

Figure 5:
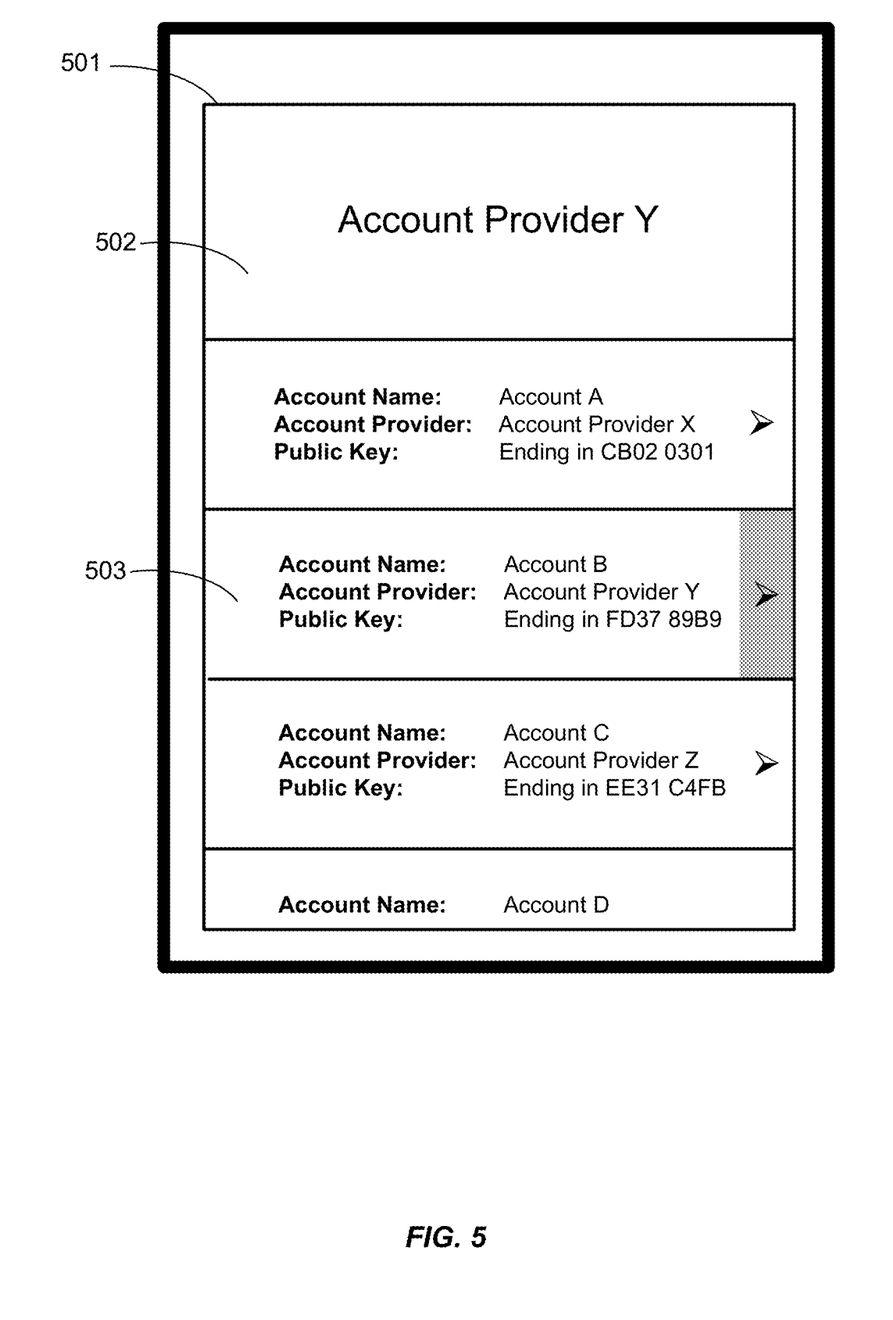
FIG. 5 shows an exemplary page on a graphical user interface provided by a key manager software application, in accordance with some embodiments.

FIG. 5 shows an exemplary page on a graphical user interface 501 provided by a key manager software application, in accordance with some embodiments. As shown in FIG. 5, the key manager software application can enable a user to select from among numerous public keys to use for account login. For example, a user device may have received a login page (at step 401) and may need input from the user (at step 402), as described above with respect to FIG. 4. The user device may render and display the graphical user interface 501 to enable the user (e.g., user 460) to select a public key to be included in a login request message.

Box 502 of the graphical user interface 501 indicates which account provider the user device is attempting to login to. In this generic example, the account provider is "Account Provider Y." The graphical user interface 501 lists several account names that the key manager software application has registered along with the account provider that the account is with and an indication of the public key registered with that account.

For example, box 503 of the graphical user interface 501 shows an account name of "Account B" that was registered with "Account Provider Y" using a public key ending in "FD37 89B9." The public key value may be displayed in hexadecimal format. In some embodiments, the entire public key may be displayed. In some embodiments, the entire public key may be displayed on a different page of the key manager software application.

Upon selecting box 502, the key manager software application may include the account name "Account B" and the public key (e.g., the entire value of the public key) in a login request message and may send the login request message to the web authentication server handling authentication for "Account Provider Y."

IV. Exemplary Method

An exemplary method for account login authentication performed by a user device is described below.

The method includes sending, by a user device, a login request message to a web authentication server. The login request message includes a public key. The public key, along with a corresponding private key, forms a first public-private key pair. The method further includes receiving, by the user device, an encrypted challenge from the web authentication server. The method further includes decrypting, by the user device, the encrypted challenge using the private key to obtain a decrypted challenge. The method further includes sending, by the user device, the decrypted challenge to the web authentication server. The method further includes receiving, by the user device, account information from the web authentication server.

The method can further include displaying, by the user device, one or more account names on a user interface of the user device. The method can further include determining, by the user device, a first account name based on input to the user interface. The one or more account names, being displayed, can include the first account name. The method can further include determining, by the user device, that the first public-private key pair is associated with the first account name. The method can further include creating, by the user device, the login request message based on the determining that the first public-private key pair is associated with the first account name. The login request message can further include the account name.

The method can further include determining, by the user device that the public key is associated with an encrypted private key. This step can be performed in response to the receiving of the encrypted challenge. The method can further include determining, by the user device, authentication information based on input to a user interface of the user device. The authentication information can be a password used to encrypt the private key for secure storage. The method can further include decrypting, by the user device, the encrypted private key based on the authentication information. By decrypting the encrypted private key, the user device can obtain the private key, unencrypted.

Prior to performing the account login steps described above, the method can perform account registration steps. As part of account registration, the method can further include generating, by the user device, the public-private key pair. The method can further include sending, by the user device, a registration request message to the web authentication server. The registration request message can include the public key. The method can further include receiving, by the user device, a registration response from the web authentication server. The registration response can include an indication that the public key is registered to the user device.

In some embodiments, the method can further include determining, by the user device, an account name based on input from a user interface of the user device. The method can also further include creating, by the user device, the registration request message based on the input from the user interface. The registration request message can further include the account name.

In some embodiments, the method can further include determining, by the user device, authentication information based on input to a user interface of the user device. The authentication information may be a password for encrypting the private key for secure storage. The method can further include encrypting, by the user device, the private key based on the authentication information to obtain an encrypted private key. The method can further include storing, by the user device, the encrypted private key and the public key. The method can further include associating, by the user device, the encrypted private key with the public key.

The method can further include displaying, by the user device, one or more account names and associated public keys on a user interface of the user device. The method can further include displaying, by the user device, the decrypted challenge on the user interface.

An exemplary method for account login authentication performed by a web authentication server is described below.

The method includes receiving, by a web authentication server, a login request message from a user device. The login request includes a public key. The method further includes verifying, by the web authentication server, that the public key matches a registered public key associated with an account. The method further includes generating, by the web authentication server, a first challenge. The first challenge may be a randomly generated alphanumeric string of characters. The method further includes encrypting, by the web authentication server, the first challenge using the public key to obtain an encrypted challenge. The method further includes sending, by the web authentication server, the encrypted challenge to the user device. The method further includes receiving, by the web authentication server, a second challenge from the user device. The method further includes determining, by the web authentication server, that the second challenge matches the first challenge. The method further includes sending, by the web authentication server in response to the determining that the second challenge matches the first challenge, account information to the user device.

The method can further include determining, by the web authentication server, that the public key is associated with the account name. The method can further include determining, by the web authentication server, that the account information is associated with the account name.

The method can further include an account registration process occurring before the account login process. The method can further include receiving, by the web authentication server, a registration request message from the user device. The registration request message can include the public key. The method can further include determining, by the web authentication server, whether the public key included in the registration request message does or does not match at least one of a plurality of registered public keys. The method can further include determining, by the web authentication server, whether to register the public key based on the determining of whether the public key included in the registration request message does or does not match the at least one of the plurality of registered public keys. The method can further include sending, by the web authentication server, a registration response message including an indication of whether or not the public key is registered to the user device.

In some embodiments, the registration part of the method can further include storing, by the web authentication server, the public key and associating, by the web authentication server, an account name with the public key.

In some embodiments, the registration part of the method can further include registering, by the web authentication server the public key by associating it with an account name. This step can be performed in response to determining that the public key included in the registration request message does not match any registered public key of the plurality of registered public key. The method can further include creating, by the web authentication server, the registration response message. The indication included in the registration response can indicate that the public key is registered.

In some embodiments, the registration request message further includes the account name. In such embodiments, the method can further include determining, by the web authentication server, whether the account name included in the registration request message does or does not match at least one of a plurality of registered account names. In addition, the method can further include determining, by the web authentication server, whether to register the account name based on the determining of whether the account name included in the registration request message does or does not match the at least one of the plurality of registered account names. In this case, the registration response message further includes a second indication of whether or not the account name is registered with the public key.

Embodiments of the invention present a number of advantages. Authentication using public-private key cryptography does not suffer from many of the security flaws described above with respect to password-based authentication. For instance, a security compromise of the user device's registered public key at the web authentication server, or any other server, does not compromise the user's authentication information (e.g., the private key pair) because the public key cannot be used to decrypt a challenge encrypted by the public key to obtain the same challenge generated by the web authentication server. With public-private key cryptography, the private key is required to decrypt a challenge encrypted by the public key. However, the private key may be securely stored at the user device and may not be sent over a communication network. Thus, a compromise at the server side does not compromise the user's authentication information.

Another advantage of public-private key cryptography-based authentication is that the authentication information can be securely stored in a secure hardware or software environment implemented on the user device. When passwords are used as authentication information, they must be available as clear text (e.g., unencrypted), outside of any secure environment, at some point during the registration and/or login process in order to provide the password to the web authentication server. By contrast, with public-private key cryptography-based authentication, the private key (e.g., the authentication information) of the public-private key pair may be generated and stored within the secure environment while the public key and the encrypted/decrypted challenge may be accessible outside of the secure environment. As such, the authentication information for authenticating with the web authentication server (e.g., the private key) is secured even if the non-secure environment of the user device is comprised.

In addition, private keys cannot be determined from the user through phishing or social engineering techniques. For example, a phishing website would at best receive a decrypted challenge as proof of authentication from the user device. The phishing website would not receive the private key. Furthermore, social engineering techniques would be ineffective because the user may not know, or be able to view, the private key if it is stored within the secure environment. Even if the private key were available to the user, they are unlikely to be able to recall its value since the user does may not directly interact with the private key value and the value may be so long as to be impractical to recall.

Thus, public-private key cryptography-based authentication provides numerous security improvements over password-based authentication processes.

A computer system may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a," "an," or "the" is intended to mean "at least one," unless specifically indicated to the contrary.

What is claimed is:

1. A method for account login authentication, the method comprising:
    sending, by a user device, a login request message to an authentication server, the login request message including a public key, the public key and a private key forming a first public-private key pair, and wherein responsive to receiving the login request message with the public key, the authentication server verifies that the public key matches one of a plurality of registered public keys stored in a database, the public key associated with an account, and then generates and encrypts a challenge, and transmits the encrypted challenge to the user device;
    receiving, by the user device, an encrypted challenge from the authentication server;
    decrypting, by the user device, the encrypted challenge using the private key to obtain a decrypted challenge;
    sending, by the user device, the decrypted challenge to the authentication server; and
    receiving, by the user device, account information associated with the account from the authentication server.

2. The method of claim 1, further comprising:
    displaying, by the user device, one or more account names on a user interface of the user device;
    determining, by the user device, a first account name based on input to the user interface, the one or more account names including the first account name; and
    determining, by the user device, that the first public-private key pair is associated with the first account name; and
    creating, by the user device, the login request message based on the determining that the first public-private key pair is associated with the first account name, wherein the login request message further includes the first account name.

3. The method of claim 1, further comprising:
    determining, by the user device in response to the receiving of the encrypted challenge, that the public key is associated with an encrypted private key;
    determining, by the user device, authentication information based on input to a user interface of the user device; and
    decrypting, by the user device, the encrypted private key based on the authentication information to obtain the private key.

4. The method of claim 1, further comprising:
    generating, by the user device, the first public-private key pair;
    sending, by the user device, a registration request message to the authentication server, the registration request message including the public key; and
    receiving, by the user device, a registration response from the authentication server, the registration response including an indication that the public key is registered to the user device.

5. The method of claim 4, further comprising:
    determining, by the user device, an account name based on input from a user interface of the user device; and
    creating, by the user device, the registration request message based on the input from the user interface, wherein the registration request message further includes the account name.

6. The method of claim 4, further comprising:
    determining, by the user device, authentication information based on input to a user interface of the user device;
    encrypting, by the user device, the private key based on the authentication information to obtain an encrypted private key;
    storing, by the user device, the encrypted private key and the public key; and
    associating, by the user device, the encrypted private key with the public key.

7. The method of claim 1, further comprising:
    displaying, by the user device, one or more account names and associated public keys on a user interface of the user device; and
    displaying, by the user device, the decrypted challenge on the user interface.

8. A method for account login authentication, the method comprising:
    receiving, by an authentication server, a login request message from a user device, the login request message including a public key;
    responsive to receiving the login request message including the public key, verifying, by the authentication server, that the public key matches a registered public key in a plurality of registered public keys stored in a database, the registered public key associated with an account;
    responsive to verifying that the public key matches the registered public key, generating, by the authentication server, a first challenge;
    encrypting, by the authentication server, the first challenge using the public key to obtain an encrypted challenge;
    sending, by the authentication server, the encrypted challenge to the user device;

receiving, by the authentication server, a second challenge from the user device;
determining, by the authentication server, that the second challenge matches the first challenge; and
sending, by the authentication server in response to the determining that the second challenge matches the first challenge, account information to the user device.

9. The method of claim 8, wherein the login request message further includes an account name, the method further comprising:
determining, by the authentication server, that the public key is associated with the account name; and
determining, by the authentication server, that the account information is associated with the account name.

10. The method of claim 8, further comprising:
receiving, by the authentication server, a registration request message from the user device, the registration request message including the public key;
determining, by the authentication server, whether the public key included in the registration request message does or does not match at least one of a plurality of registered public keys;
determining, by the authentication server, whether to register the public key based on the determining of whether the public key included in the registration request message does or does not match the at least one of the plurality of registered public keys; and
sending, by the authentication server, a registration response message including an indication of whether or not the public key is registered to the user device.

11. The method of claim 10, further comprising:
storing, by the authentication server, the public key; and
associating, by the authentication server, an account name with the public key.

12. The method of claim 10, wherein the determining of whether to register the public key includes determining that the public key included in the registration request message does match at least one of the plurality of registered public keys, the method further comprising:
registering, by the authentication server in response to determining that the public key included in the registration request message does not match any registered public keys of the plurality of registered public keys, the public key by associating it with an account name; and
creating, by the authentication server, the registration response message, wherein the indication included in the registration response message indicates that the public key is registered.

13. The method of claim 12, wherein the registration request message further includes the account name, the method further comprising:
determining, by the authentication server, whether the account name included in the registration request message does or does not match at least one of a plurality of registered account names; and
determining, by the authentication server, whether to register the account name based on the determining of whether the account name included in the registration request message does or does not match the at least one of the plurality of registered account names, wherein the registration response message further includes a second indication of whether or not the account name is registered with the public key.

14. A user device, comprising:
one or more processor circuits;
a communication interface; and
a computer readable storage medium storing a plurality of instructions that, when executed by the one or more processor circuits, cause the one or more processor circuits to:
send, using the communication interface, a login request message to an authentication server, the login request message including a public key, the public key and a private key forming a first public-private key pair, and wherein responsive to receiving the login request message with the public key, the authentication server verifies that the public key matches one of a plurality of registered public keys stored in a database, the public key associated with an account, and then generates and encrypts a challenge, and transmits the encrypted challenge to the user device;
receive, using the communication interface, an encrypted challenge from the authentication server;
decrypt the encrypted challenge using the private key to obtain a decrypted challenge;
send, using the communication interface, the decrypted challenge to the authentication server; and
receive, using the communication interface, account information associated with the account from the authentication server.

15. The user device of claim 14, further comprising a user interface, wherein the plurality of instructions further cause the one or more processor circuits to:
display, using the user interface, one or more account names on a user interface of the user device;
determine, using the user interface, a first account name based on input to the user interface, the one or more account names including the first account name; and
determine that the first public-private key pair is associated with the first account name; and
create the login request message based on the determining that the first public-private key pair is associated with the first account name, wherein the login request message further includes the first account name.

16. The user device of claim 14, further comprising a user interface, wherein the plurality of instructions further cause the one or more processor circuits to:
determine, in response to the receiving of the encrypted challenge, that the public key is associated with an encrypted private key;
determine, using the user interface, authentication information based on input to the user interface; and
decrypt the encrypted private key based on the authentication information to obtain the private key.

17. The user device of claim 14, wherein the plurality of instructions further cause the one or more processor circuits to:
generate the first public-private key pair;
send, using the communication interface, a registration request message to the authentication server, the registration request message including the public key; and
receive, using the communication interface, a registration response from the authentication server, the registration response including an indication that the public key is registered to the user device.

18. The user device of claim 17, wherein the plurality of instructions further cause the one or more processor circuits to:
determine an account name based on input from a user interface of the user device; and create the registration request message based on the input from the user interface, wherein the registration request message further includes the account name.

19. The user device of claim 17, further comprising a user interface and a system memory, wherein the plurality of instructions further cause the one or more processor circuits to:
   determine, using the user interface, authentication information based on input to the user interface;
   encrypt the private key based on the authentication information to obtain an encrypted private key;
   store, on the system memory, the encrypted private key and the public key; and
   associate the encrypted private key with the public key.

20. The user device of claim 14, further comprising a user interface, wherein the plurality of instructions further cause the one or more processor circuits to:
   display one or more account names and associated public keys on the user interface; and
   display the decrypted challenge on the user interface.

\* \* \* \* \*